(12) United States Patent
Niemi et al.

(10) Patent No.: US 7,734,049 B2
(45) Date of Patent: Jun. 8, 2010

(54) DATA TRANSMISSION METHOD, USER EQUIPMENT AND GPRS/EDGE RADIO ACCESS NETWORK

(75) Inventors: Valtteri Niemi, Helsinki (FI); Kari Niemela, Oulu (FI); Guillaume Sebire, Helsinki (FI); Shkumbin Hamiti, Helsinki (FI)

(73) Assignee: Nokia Corporation, Espoo (FI)

( * ) Notice: Subject to any disclaimer, the term of this patent is extended or adjusted under 35 U.S.C. 154(b) by 1365 days.

(21) Appl. No.: 09/920,057

(22) Filed: Aug. 1, 2001

(65) Prior Publication Data

US 2002/0035682 A1 Mar. 21, 2002

(30) Foreign Application Priority Data

Aug. 1, 2000 (FI) ................... 20001734

(51) Int. Cl.
*H04K 1/00* (2006.01)
*H04W 36/00* (2009.01)
*H04W 4/00* (2009.01)
*H04M 1/66* (2006.01)
*H04M 1/68* (2006.01)
*H04M 3/16* (2006.01)

(52) U.S. Cl. ................ 380/270; 380/247; 380/272; 455/410; 455/411; 455/426.1; 455/436; 370/331

(58) Field of Classification Search ............... 380/270, 380/272, 247; 455/403, 410, 411, 422.1, 455/436, 426.1; 370/328, 331, 335–337, 370/342, 345, 347–349, 469

See application file for complete search history.

(56) References Cited

U.S. PATENT DOCUMENTS 6,438,117 B1 * 8/2002 Grilli et al. ................. 370/331

6,466,556 B1 * 10/2002 Boudreaux ................. 370/331

(Continued)

FOREIGN PATENT DOCUMENTS

WO WO 99/25093 5/1999

(Continued)

OTHER PUBLICATIONS

Technical Specification 3G TR 25.832 version 3.0.0, "Manifestations of Handover and SRNS Relocation". Publication of the 3rd Generation Partnership Project, Oct. 1999.*

(Continued)

*Primary Examiner*—Zachary A Davis
(74) *Attorney, Agent, or Firm*—Perman & Green, LLP

(57) ABSTRACT

The invention relates to a method for transmitting data between a GRPS/EDGE radio access network and user equipment of a mobile system, and to user equipment using the method, and to GERAN. In the method, the data to be transmitted is encrypted using an encryption algorithm at the transmitting end, the encrypted data is transmitted from the transmitting end to the receiving end, and the transmitted data is decrypted using an encryption algorithm at the receiving end. The used encryption algorithm is an encryption algorithm of the radio access network UTRAN employing the wideband code division multiple access method of the universal mobile telecommunications system, in which case the input parameters of agreed format required by the encryption algorithm are created on the basis of the operating parameters of the GPRS/EDGE radio access network GERAN.

38 Claims, 7 Drawing Sheets

U.S. PATENT DOCUMENTS

| | | | |
|---|---|---|---|
| 6,768,903 B2 * | 7/2004 | Fauconnier et al. | 455/403 |
| 6,845,095 B2 * | 1/2005 | Krishnarajah et al. | 370/349 |
| 7,236,787 B1 * | 6/2007 | Tamura et al. | 455/437 |

FOREIGN PATENT DOCUMENTS

| | | |
|---|---|---|
| WO | WO 99/56445 | 11/1999 |
| WO | WO 00/02406 | 1/2000 |
| WO | WO 0172081 A1 * | 9/2001 |

OTHER PUBLICATIONS

Technical Specification 3G TS 33.102 version 3.2.0, "Security Architecture". Publication of the 3rd Generation Partnership Project, Oct. 1999.*

Technical Specification 3G TS 25.301 version 3.4.0, "Radio Interface Protocol Architecture". Publication of the 3rd Generation Partnership Project, Mar. 2000.*

Technical Specification 3G TS 25.401 version 3.1.0, "UTRAN Overall Description". Publication of the 3rd Generation Partnership Project, Jan. 2000.*

Technical Specification, 3G TS 33.102 V3.2.0, "Security Architecture".

Technical Specification, 3G TS 25.301 V3.4.0, "Radio Interface Protocol Architecture".

Technical Specification, 3G TS 33.105 V3.3.0, "Cryptographic Algorithm Requirements".

Pichna et al.: "Wireless Internet-IMT-2000/Wireless LAN Interworking", Journal of Communications and Networks, vol. 2, No. 1, Mar. 2000, pp. 46-57.

* cited by examiner

DATA TRANSMISSION METHOD, USER EQUIPMENT AND GPRS/EDGE RADIO ACCESS NETWORK

FIELD

The invention relates to a method for transmitting data between a GPRS/EDGE radio access network GERAN (General Packet Radio Service/Enhanced Data Rates for GSM Evolution) and user equipment of a mobile system, to user equipment and to a GPRS/EDGE radio access network GERAN.

BACKGROUND

When transmitting data from GERAN to user equipment and vice versa, the data to be transmitted must be encrypted (ciphered) before transmission for security reasons. Encryption makes tapping of signaling and user data difficult. The data to be transmitted is encrypted using an encryption algorithm at the transmitting end and the encrypted data is transmitted from the transmitting end to the receiving end, where the transmitted data is decrypted using an encryption algorithm. The same encryption algorithm is used at both ends.

An encryption mask created by the encryption algorithm is attached to the data to be encrypted using an XOR operation (logical exclusive OR operation), so the encryption does not per se increase the number of bits to be transmitted. This can be presented by the formula $$C = M \oplus P \quad (1)$$

wherein C is the encrypted data, M is the encryption mask, P is the unencrypted data and $\oplus$ is the XOR operation.

The encryption algorithm requires input parameters to make the encryption mask created by the algorithm different for each user and each usage time. The most important parameter is the encryption key whose length is 128 bits, for instance. A different encryption key, and thus also a different encryption mask, is used for each user. However, a problem arises from the fact that the same encryption mask cannot be used twice for data with different content. This prohibited situation can be described by the formula $$\begin{array}{r} P_1 \oplus M = C_1 \\ \oplus \quad P_2 \oplus M = C_2 \\ \hline P_1 \oplus P_2 = C_1 \oplus C_2 \end{array} \quad (2)$$

wherein $P_1$ and $P_2$ are unencrypted data with different content and $C_1$ and $C_2$ are encrypted data with different content. As can be seen, a possible eavesdropper can remove the mask by performing an XOR operation between the data having different content and encrypted using the same mask, thus breaking the encryption.

Because of this, other parameters are also used in encryption algorithms, for instance the encryption algorithm of a radio access network (UTRAN) employing the wideband code division multiple access method of the universal mobile telecommunications system (UMTS) uses as input parameters a counter parameter which changes with time, a directional parameter (uplink/downlink) and a bearer parameter.

The structure of the encryption algorithm to be used in GERAN has not yet been decided. It should, however, meet at least the following requirements:

implicit encryption synchronization, especially in connection with handover, similar approach to both real-time and non-real-time services, incremental redundance, multiplexing several different users to the same time slot, multiplexing several different radio bearers to the same user equipment, enabling multi-slot operation.

BRIEF DESCRIPTION OF THE INVENTION

It is an object of the invention to provide an improved method for transmitting data between a GPRS/EDGE radio access network GERAN and user equipment of a mobile system, a piece of improved user equipment and an improved GPRS/EDGE radio access network GERAN. As an aspect of the invention, a method according to claim 1 is presented for transmitting data between a GPRS/EDGE radio access network GERAN and user equipment of a mobile system. As a second aspect of the invention, user equipment according to claim 17 is presented. As a third aspect of the invention, a GPRS/EDGE radio access network GERAN according to claim 33 is presented. Preferred embodiments of the invention are disclosed in the dependent claims.

The invention is based on re-using the encryption algorithm of UTRAN as such in GERAN. This is made possible by defining the internal operation of the encryption algorithm as a black box and by modifying the input parameters required by the encryption algorithm according to the requirements set by GERAN.

The method and apparatus of the invention provide several improvements. Designing a new encryption algorithm is a very demanding operation. When using the invention, a new encryption algorithm need not be designed for GERAN, but the already designed UTRAN encryption algorithm can be used instead. This saves a considerable amount of work as well as product development costs caused by it. The invention also facilitates the design of user equipment capable of contacting both UTRAN and GERAN.

BRIEF DESCRIPTION OF THE FIGURES

In the following, the invention will be described in greater detail by means of the preferred embodiments and with reference to the attached drawings, in which.

DESCRIPTION OF EMBODIMENTS

Specifications for third-generation mobile systems, such as UMTS, are being developed by 3GPP (Third Generation Partnership Project). The 3GPP specifications which are related to encryption in particular are incorporated herein by reference:

3G TS 33.102 V3.2.0: Security Architecture

3G TS 25.301 V3.4.0: Radio Interface Protocol Architecture

3G TS 33.105 V3.3.0: Cryptographic Algorithm Requirements.

A typical radio system structure and its connections to a public switched telephone network and packet transmission network are described with reference to FIGS. 1A and 1B. FIG. 1B only contains blocks essential for describing the embodiments, but it is clear to a person skilled in the art that a conventional cellular network also contains other functions and structures which need not be described in greater detail herein. The radio system of the invention uses a GPRS/EDGE radio access network GERAN. The term GERAN refers to an evolution of the GSM (Global System for Mobile Communication) system, the TDMA/136 (Time Division Multiple Access) system and the EDGE system, which is intended to provide full third-generation (UMTS/WCDMA/cdma2000) mobile services.

Thus in a sense, GERAN is an intermediate form of the GSM-based GPRS or EGPRS (Enhanced General Packet Radio Service) and the universal mobile telecommunications system UMTS employing wideband code division multiple access, in which the structure of the radio access network is outlined in UMTS style and the radio access network is called GERAN, for instance, and in which the radio interface is, however, a normal GSM-based radio interface or a radio interface employing EDGE modulation. EGPRS is a GSM-based system utilizing packet-switched transmission. EGPRS uses EDGE technology to increase data transmission capacity. In addition to GMSK (Gaussian Minimum-Shift Keying) modulation, which is used normally in GSM, it is possible to use 8-PSK (8-Phase Shift Keying) modulation for packet data channels. The aim is mainly to implement non-real-time data transmission services, such as file copying and the use of an Internet browser, but also real-time packet-switched services in the transmission of speech and video images, for instance.

Figure 1A:
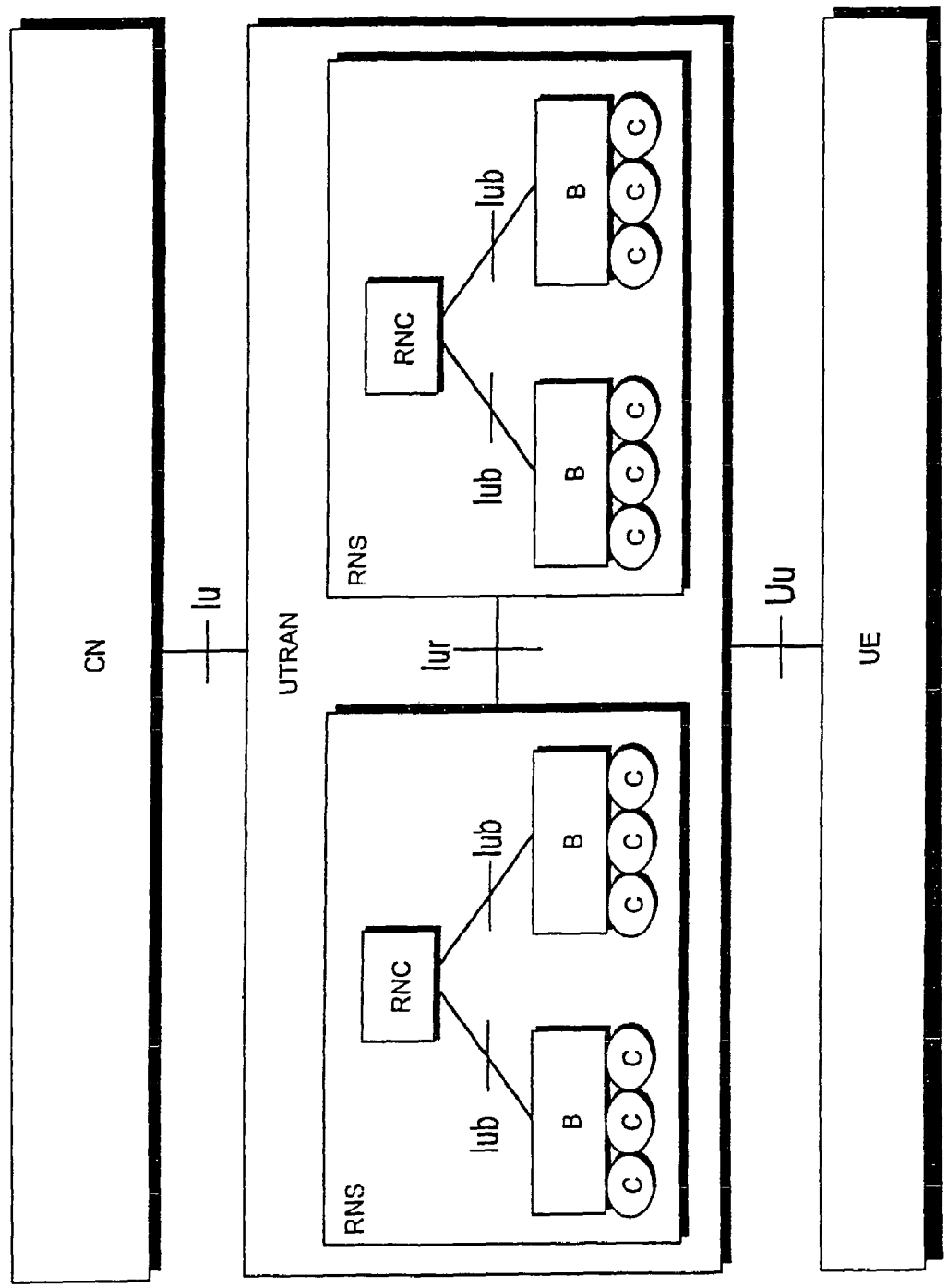
FIG. 1A shows an example of the structure of a cellular network.
Figure 1B:
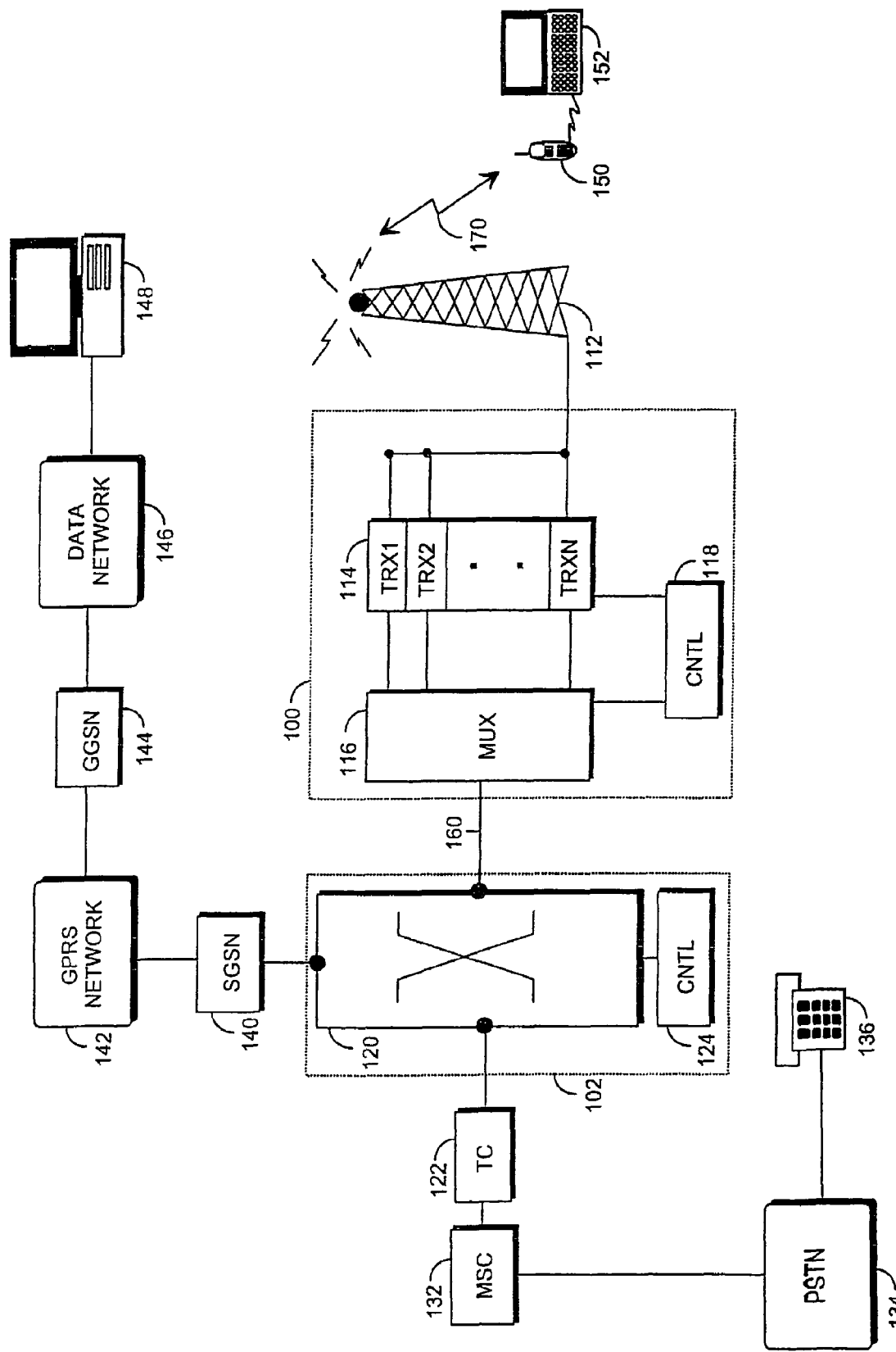
FIG. 1B is a block diagram showing the cellular network in greater detail.

The descriptions of FIG. 1A and 1B are mainly based on UMTS. The main parts of a mobile system are a core network CN, a UMTS terrestrial radio access network UTRAN, and user equipment UE. The interface between CN and UTRAN is called Iu, and the radio interface between UTRAN and UE is called Uu.

UTRAN is made up of radio network subsystems RNS. The interface between RNSs is called Iur. RNS is made up of a radio network controller RNC and one or more nodes B. The interface between RNC and B is called Iub. The coverage area, i.e. cell, of a node B is marked C in FIG. 1A. RNS can also be called by its more traditional name, base station system (BSS). The network part of the radio system thus comprises a radio access network UTRAN and a core network CN.

The description in FIG. 1A is very abstract so it is clarified in FIG. 1B by indicating approximately which part of the GSM system corresponds to which part in UMTS. It should be noted that the presented description is in no way binding but for the purpose of illustration, since the responsibilities and functions of the different parts of UMTS are still being designed.

User equipment 150 can, for instance, be fixed, installed in a vehicle, or portable. The user equipment 150 is also known as a mobile station MS. The infrastructure of the radio access network UTRAN is made up of radio network subsystems RNS, i.e. base station systems. A radio network subsystem RNS is made up of a radio network controller RNC, i.e. base station controller, 102 and at least one node B, i.e. base station, 100 controlled by it.

The base station B has a multiplexer 116, transceivers 114 and a control unit 118 which controls the operation of the transceivers 114 and the multiplexer 116. Traffic and control channels used by the transceivers 114 are placed on the transmission link 160 by the multiplexer 116.

The transceivers 114 of the base station B are connected to an antenna unit 112 which implements a bi-directional radio link Uu to the user equipment 150. The structure of frames transmitted in the bi-directional radio link Uu is exactly defined.

The radio network controller RNC comprises a group switching field 120 and control unit 124. The group switching field 120 is used for speech and data connection and to connect signaling circuits. The base station system formed by the base station B and the radio network controller RNC also comprises a transcoder 122. Work distribution between the radio network controller RNC and the base station B as well as their physical structure can vary depending on implementation. Typically, the base station B takes care of the radio path implementation as described above. The radio network controller RNC typically takes care of the following: management of radio resources, control of handover between cells, power adjustment, timing and synchronization, paging user equipment.

The transcoder 122 is usually located as close as possible to a mobile switching center 132, because speech can then be transmitted in mobile telephone system format between the transcoder 122 and the radio network controller RNC, saving transmission capacity. The transcoder 122 converts the different digital coding formats of speech used between the public switched telephone network and the mobile network to be compatible with each other, for instance from the 64 kbit/s format of a public network to another (e.g. 13 kbit/s) format of a cellular network and vice versa. The hardware required is not described in detail herein, but it can be noted that other data than speech is not converted in the transcoder 122. The control unit 124 takes care of call control, mobility management, collection of statistics, and signaling.

The core network CN comprises an infrastructure belonging to a mobile telephone system and external to UTRAN. Of the apparatuses belonging to the circuit-switched transmission of the core network CN, FIG. 1B shows the mobile switching center 132.

As shown in FIG. 1B, connections (shown as black dots) can be made with the switching field 120 to both a public switched telephone network 134 through the mobile switching center 132 and to a packet-switched network 142. A typical terminal 136 in the public switched telephone network 134 is a conventional phone or an ISDN (Integrated Services Digital Network) phone. Packet transmission is performed from a computer 148 connecting to the mobile system through the Internet 146 to a portable computer 152 connected to the user equipment 150. Instead of a combination of the user equipment 150 and portable computer 152, a WAP (Wireless Application Protocol) phone can be used.

The connection between the packet transmission network 142 and the switching field 120 is established by a serving GPRS support node (SGSN) 140. The task of the serving support node 140 is to transmit packets between the base station system and a gateway GPRS support node (GGSN) 144, and to record the location of the user equipment 150 in its area.

The gateway support node 144 connects the public packet transmission network 146 and the packet transmission network 142. An Internet protocol or an X.25 protocol can be used in the interface. The gateway support node 144 hides by encapsulation the internal structure of the packet transmission network 142 from the public packet transmission network 146 so that to the public packet transmission network 146, the packet transmission network 142 seems like a subnetwork and the public packet transmission network 146 can address packets to and receive packets from the user equipment 150 in it.

The packet transmission network 142 is typically a private network that uses an Internet protocol and transfers signaling and user data. Depending on the operator, the structure of the network 142 may vary in its architecture and protocols below the Internet protocol layer.

The public packet transmission network 146 can be the Internet, for instance, over which a terminal 148, such as a server, connected to it can transmit packets to user equipment 150.

Figure 1C:
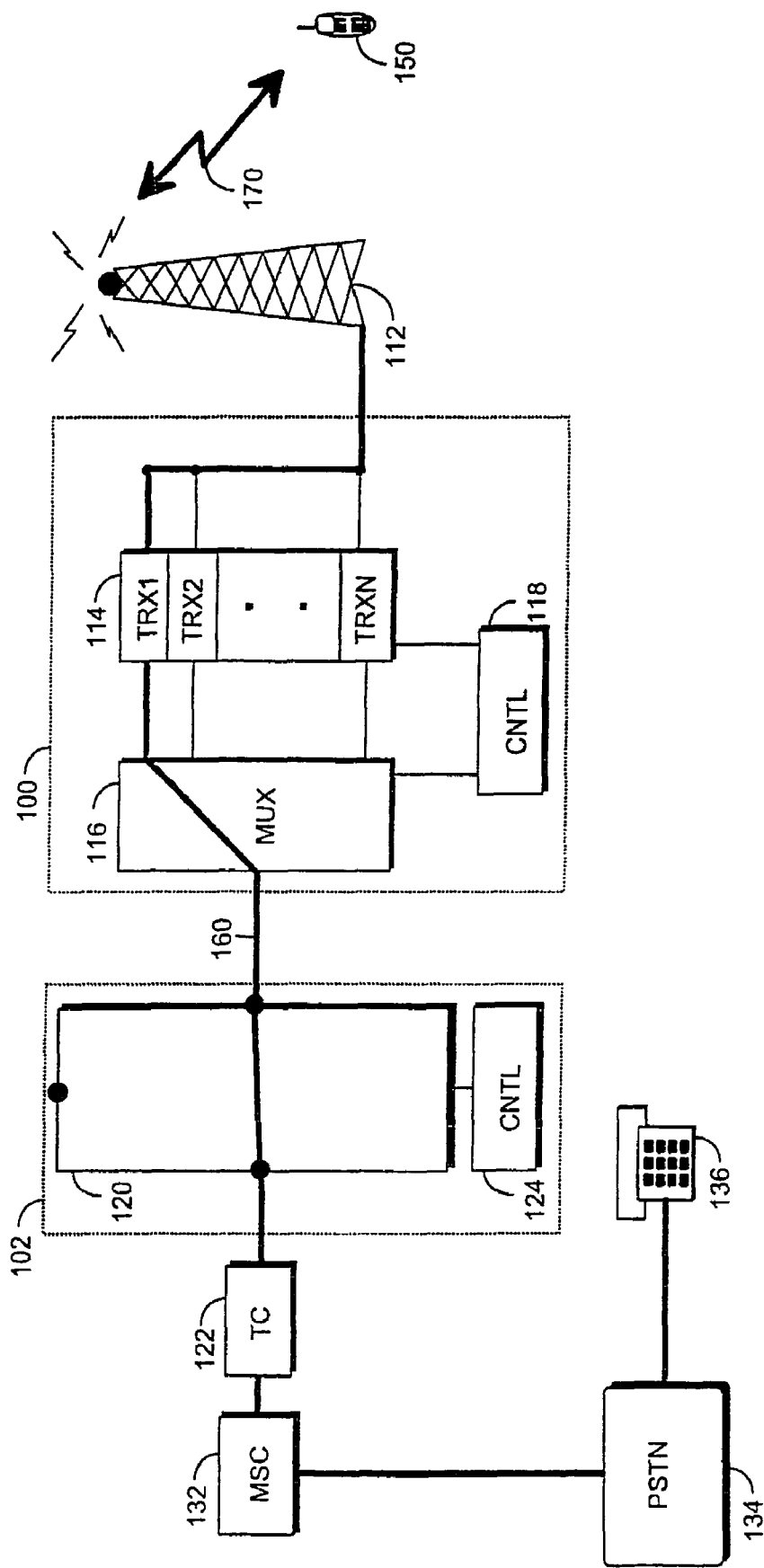
FIG. 1C shows a circuit-switched connection.

FIG. 1C shows how a circuit-switched transmission link is established between the user equipment 150 and the public switched telephone network terminal 136. In the figures, a thick line shows how data is transmitted through the system over a radio interface 170 from the antenna 112 to the transceiver 114 and from there, after multiplexing in the multiplexer 116, over the transmission link 160 to the switching field 120 which has a connection to an output to the transcoder 122, and from there on, through a connection made in the mobile switching center 132 to the terminal 136 connected to the public switched telephone network 134. In the base station 100, the control unit 118 controls the multiplexer 116 in performing the transmission, and in the base station controller 102, the control unit 124 controls the switching field 120 to make a correct connection.

Figure 1D:
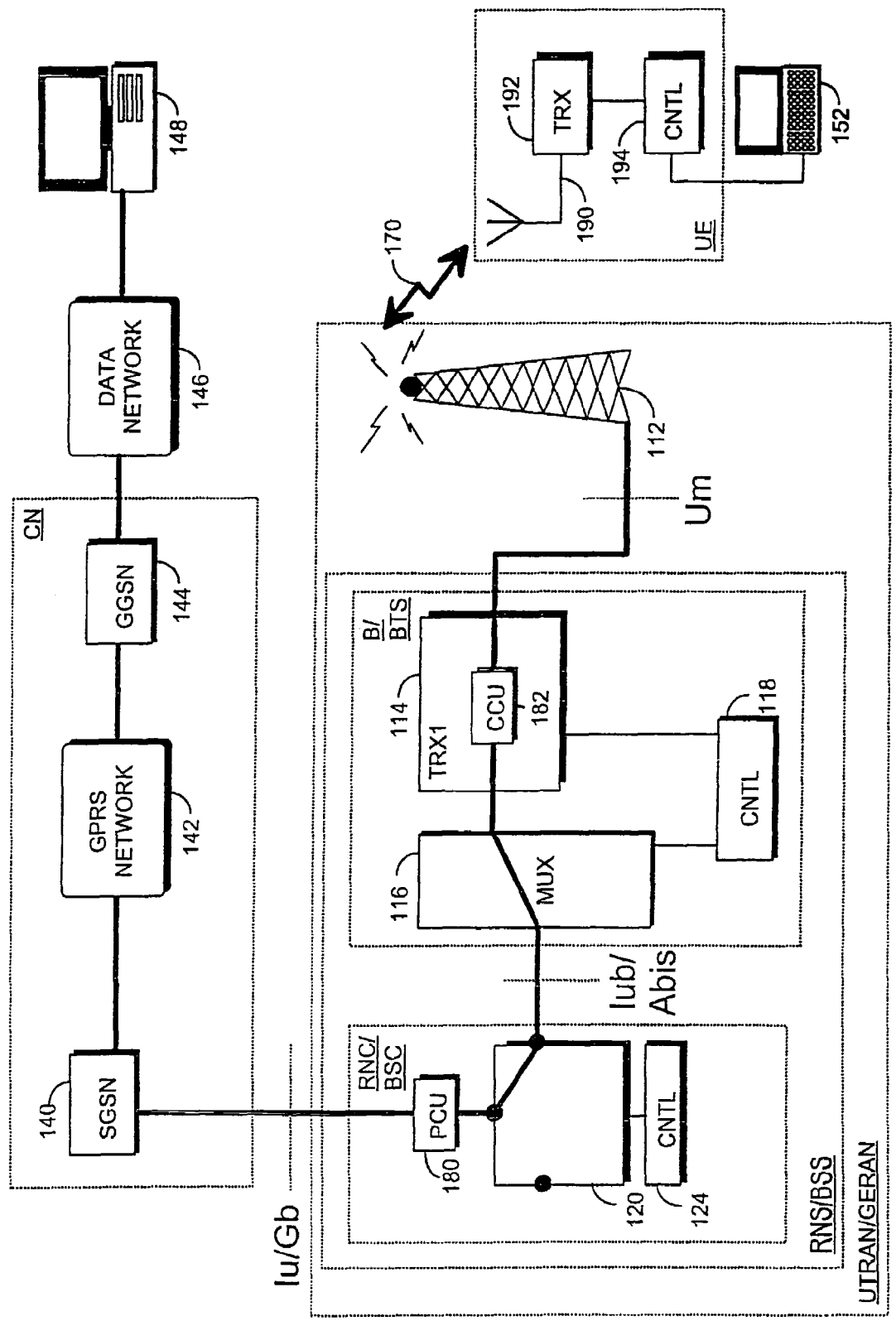
FIG. 1D shows a packet-switched connection.

FIG. 1D shows a packet-switched transmission link. A portable computer 152 is now connected to the user equipment 150. A thick line shows how the data being transmitted advances from the server 148 to the portable computer 152. Data can naturally also be transmitted in the opposite transmission direction, i.e. from the portable computer 152 to the server 148. The data advances through the system over the radio interface, i.e. Um interface, 170, from the antenna 112 to the transceiver 114, and from there, after multiplexing in the multiplexer 116, over the transmission link 160 and Abis interface to the switching field 120, from which a connection has been established to an output to the support node 140 on the Gb interface, from the support node 140, the data is transmitted over the packet transmission network 142 through the gateway node 144 to the server 148 connected to the public packet transmission network 146.

For clarity's sake, FIGS. 1C and 1D do not show a case where both circuit-switched and packet-switched data is transmitted simultaneously. This is, however, completely possible and common, since free capacity can flexibly be taken into use from circuit-switched data transmission to packet-switched transmission. A network can also be built, in which only packet data is transmitted. In such a case, the structure of the network can be simplified.

Let us examine FIG. 1D again The different entities of the UMTS system—CN, UTRAN/GERAN, RNS/BSS, RNC/BSC, B/BTS—are outlined in the figure by dashed-line boxes. In a packet-switched environment, the core network CN comprises a support node 140, packet transmission network 142 and gateway node 144.

In addition to what is described above, GPRS has two specific elements: a channel codes unit CCU and a packet control unit PCU. CCU's tasks include channel coding including FEC (Forward Error Coding) and interleaving, radio channel measuring functions, such as quality level of received signal, reception power of received signal and information related to timing advance measurements. PCU's tasks include segmenting and reassembly of an LLC (Logical Link Control) segment, ARQ (Automatic Repeat Request) functions, PDCH (Packet Data Channel) scheduling, channel access control and radio channel management functions. CCU 182 resides in the base station 100, and depending on its implementation, it can be considered to be a time-slot-specific or a transceiver-specific unit. PCU 180 is connected to CCU 182 over an Abis interface. PCU can reside in the base station 100 or in the base station controller 102. FIG. 1C shows PCU 180 in the base station controller 102, but for clarity's sake, its location in the base station 100 has not been shown.

FIG. 1D also shows the structure of the user equipment UE with respect to the parts of interest to the present application. The user equipment UE comprises an antenna 190 through which a transceiver 192 receives signals from a radio path 170. The operation of the user equipment UE is controlled by a control unit 194, which is typically a microprocessor with the necessary software. Protocol processing described later is also performed with said software. In addition to the described parts, the user equipment UE also comprises a user interface, which typically contains a loudspeaker, microphone, display and keyboard, and a battery. These are, however, not described in more detail herein, because they are not of interest to the present invention.

The structure of the transceiver in the base station B or the structure of the transceiver in the user equipment UE are not described in more detail herein, because it is clear to a person skilled in the art how said apparatuses are implemented. It is, for instance, possible to use a normal radio network transceiver and user equipment transceiver according to EGPRS. For the present application it is only important that the radio link 170 can be implemented, since the operation required by the application is then performed in the higher OSI (Open Systems Interconnection) model layers, especially in the third layer.

Figure 2:
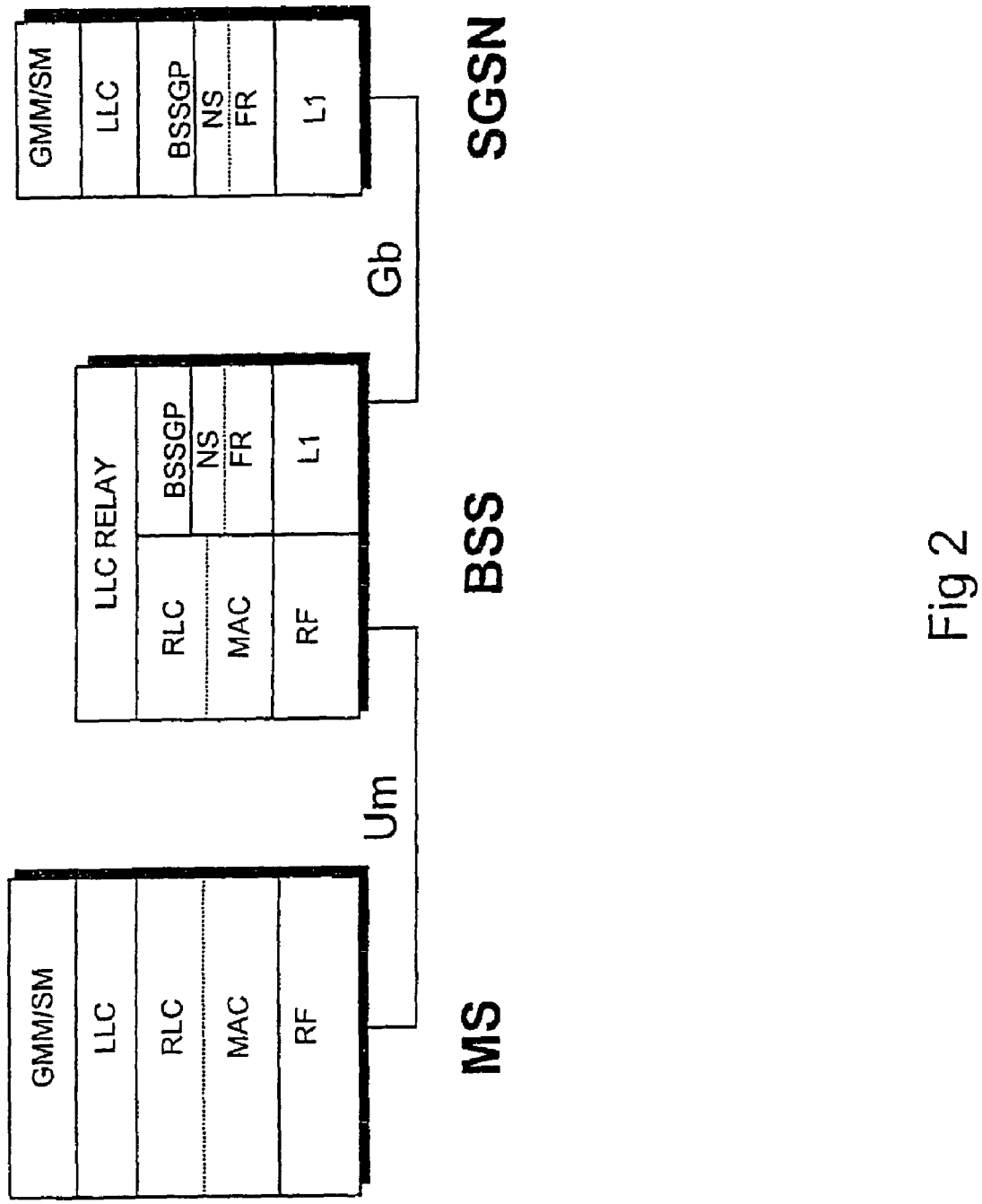
FIG. 2 shows an example of the protocol stacks of certain parts of the cellular network.

FIG. 2 shows packet protocol stacks of the EGPRS control plane. It should, however, be noted that the embodiments are not limited to EGPRS. The protocol stacks are formed according to the OSI (Open Systems Interconnection) model of ISO (International Standardization Organization). In the OSI model, the protocol stacks are divided into layers. In principle, there can be seven layers. FIG. 2 shows for each network element, the packet protocol parts that are processed in the network element in question. The network elements are the mobile station MS, base station system BSS, support node SGSN. The base station and base station controller are not shown separately, because an interface has not been defined between them. The protocol processing set for the base station system BSS can thus in principle be distributed freely between the base station 100 and the base station controller 102, not however the transcoder 122 even though it does belong to the base station system BSS. The network elements MS, BSS and SGSN are separated by interfaces Um and Gb between them.

A layer in each apparatus MS, BSS, SGSN communicates logically with a layer in another apparatus. Only the lowest, physical, layers communicate directly with each other. Other layers always use the services provided by the next lower layer. A message must thus physically advance vertically between the layers and only in the lowest layer does the message advance horizontally between the layers.

The actual bit-level data transmission is done using the lowest first, i.e. physical, layer RF, L1. The physical layer defines the mechanical, electronic and functional properties for connecting to the physical transmission path. The next, second layer, i.e. data link layer, uses the services of the physical layer for the purpose of implementing reliable data transmission and takes care of transmission error correction, for instance. On the radio interface 170, the data link layer divides into an RLC/MAC (Radio Link Control/Medium Access Control) sub-layer and an LLC (Logical Link Control) sub-layer, i.e. a logical link control protocol. The third layer, i.e. network layer, provides the higher layers independence from data transmission and switching techniques which take care of the connections between the apparatuses. The network layer takes care of connection establishment, maintenance and release, for instance. In GSM, the network layer is also called a signaling layer. It has two main tasks: routing messages and enabling several independent connections simultaneously between two entities.

The network layer comprises a session management sub-layer SM and a GPRS mobility management sub-layer GMM.

The GPRS mobility management sub-layer GMM takes care of the consequences caused by the movement of the user of the mobile station that are not directly related to radio resource management. On the side of the public switched telephone network, this sub-layer would take care of verifying the user and connecting the user to the network. In a cellular network, this sub-layer supports user mobility, registration and management of data generated by mobility. In addition, this sub-layer checks the identity of the mobile station and the identities of the allowed services. Message transmission of this sub-layer takes place between the mobile station MS and the support node SGSN.

The session management sub-layer SM manages all functions related to packet-switched call management, but does not detect the movement of the user. The session management sub-layer SM establishes, maintains and releases connections. It has its own procedures for calls initiated by and terminating to the mobile station 150. The message transmission of this sub-layer, too, takes place between the mobile station MS and the support node SGSN.

In the base station system BSS, the messages of the session management sub-layer SM and GPRS mobility management sub-layer GMM are processed transparently, i.e. they are only transferred back and forth.

According to prior art, the logical link control protocol LLC establishes a reliable encrypted logical link between SGSN and MS. LLC is independent of the lower layers so that the changing of the radio interface would affect the network part of the mobile network as little as possible. The services of the logical link control protocol include: a very reliable logical link between peer entities, support for variable-length information frames, support for both acknowledged and unacknowledged data transmission, each frame contains an unambiguous identifier of a transmitting or receiving mobile station, support for different service criteria, such as different priorities of data transmission, encryption of transmitted data and user identity. LLC data is transmitted between the Um and Gb interfaces by a logical link control protocol relay LLC RELAY. According to the solution described in this application, encryption is not performed in the LLC sub-layer, but in the MAC or RLC sub-layer. Other tasks of the LLC sub-layer can also be given to other layers, whereby the LLC sub-layer can be left out completely.

The MAC layer is responsible for the following tasks: multiplexing data and signaling on both uplink (mobile station to network part) and downlink (network part to mobile station) connections, management of uplink transmission path resource requests, and allocation and timing of downlink transmission path traffic resources. Traffic priorization management also belongs to this layer. The RLC layer takes care of transmitting LLC-layer data, i.e. LLC frames, to the MAC layer; RLC chops the LLC frames into RLC data blocks and transmits them to the MAC layer. In the uplink direction, RLC builds LLC frames of the RLC data blocks and transmits them to the LLC layer. The physical layer is implemented in the Um interface by a radio link, for instance a radio interface defined by GSM. For instance, carrier modulation, interleaving and error-correction of the data to be transmitted, synchronization and transmitter power control are performed in the physical layer.

A BSSGP (Base Station Subsystem GPRS Protocol) layer transmits data of the higher layers and information related to routing and the quality of service between BSS and SGSN. An FR (Frame Relay) layer performs the physical transmission of this information. NS (Network Service) transmits messages according to the BSSGP protocol.

Figure 4:
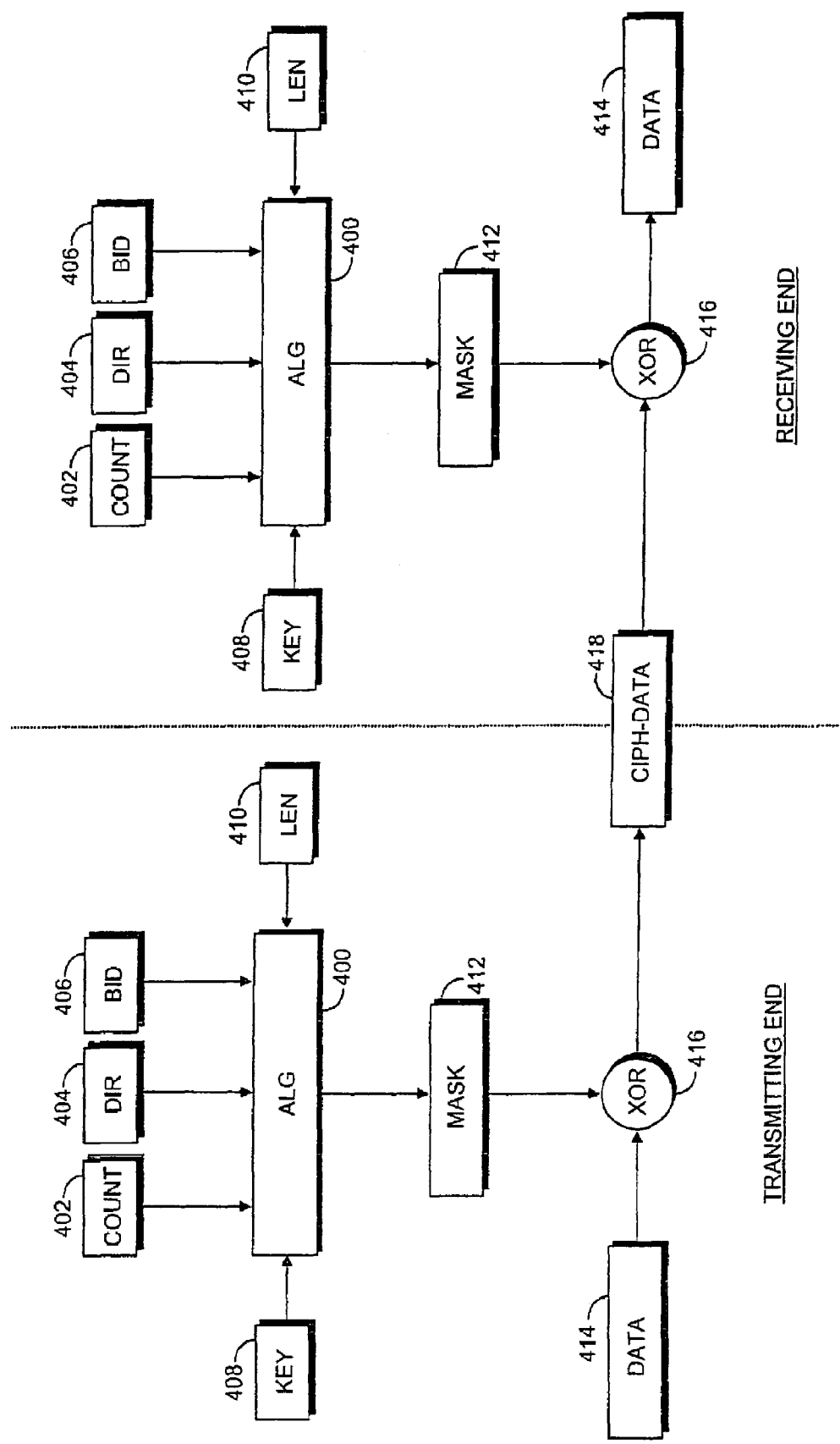
FIG. 4 illustrates encryption at the transmitting end and decryption at the receiving end.

Having now given an example of the structure of a mobile system and the protocol stacks used therein, it is possible to examine the implementation of encryption in a mobile system using GERAN. FIG. 4 shows how the data flow goes from the transmitting end to the receiving end. The transmitting end is on the left in the figure and the receiving end on the right side is separated from it by a vertical dashed line. In GERAN, encryption is performed in the packet control unit 180 described above, and in the user equipment, in the control unit 194. Encryption is performed using a function located in the described protocol stacks. The necessary function can be implemented for instance as a software run in a general-purpose processor, in which case the required functions are executed as software components. Hardware implementation is also possible, for instance ASIC (Application Specific Integrated Circuit) or a control logic made up of separate components.

The encryption algorithm 400 is that of the radio access network UTRAN employing the wideband code division multiple access method of the universal mobile telecommunications system, also known as f8. The encryption algorithm is a black box and its implementation exactly the same in both the GPRS/EDGE radio access network GERAN and the radio access network UTRAN employing the wideband code division multiple access method. In practice this means that the same encryption algorithm implementation, whether ASIC or software, can be used in both GERAN and UTRAN.

UTRAN has an agreed format for the input parameters of the encryption algorithm. The agreed format defines the number of the input parameters and the length of each parameter. The UTRAN input parameters are defined in the above-mentioned 3GPP specifications. They are: an encryption key, a counter parameter which changes with time, a directional parameter (uplink/downlink) and a bearer parameter. In addition, a parameter indicating the length of the encryption mask 412 is needed that does not per se affect the internal operation of the encryption algorithm 400, but only indicates how many created symbols are taken from the key stream to the encryption mask 412.

The unencrypted data 414 is combined by an XOR operation 416 with the encryption mask 412 to obtain the encrypted data 418.

At the receiving end, the encryption is removed using a similar operation as in the transmitting end, i.e. the encryption mask 412 is combined by an XOR operation 416 with the received encrypted data 418 to obtain the original unencrypted data 414.

The transmitting and receiving ends must be synchronized with each other in the sense that the parameters 402, 404, 406, 408, 410 of the encryption algorithm 400 used to encrypt certain data 414 must also be used to decrypt the encrypted data 418 corresponding to said unencrypted data 414. Implementing this may require signaling between the transmitting end and the receiving end. This or data modulation and channel coding are not described in more detail herein, because they are not essential for the invention and are known actions to a person skilled in the art. It is enough to note that the transmitting end comprises means 400, 416 for encrypting data to be transmitted to the receiving end using an encryption algorithm 400, and the receiving end correspondingly comprises means 400, 416 for decrypting data received from the transmitting end using the encryption algorithm 400. Because the connection between GERAN and the user equipment is bi-directional, both can serve as transmitting and receiving ends. Thus, both GERAN and the user equipment comprise both the encryption means and the decryption means.

The GPRS/EDGE radio access network GERAN comprises means 402, 404, 406, 408, 410 for creating the input parameters of agreed format required by the encryption algorithm 400 on the basis of the operating parameters of the GPRS/EDGE radio access network GERAN. The user equipment UE comprises the same means 402, 404, 406, 408, 410. For clarity's sake, FIG. 4 uses the same reference numerals 402, 404, 406, 408, 410 to depict both the parameters of the encryption algorithm 400 and the means to process them. In practice, said means are preferably implemented by software in the control unit 194 of the user equipment UE or in the packet control unit 180 of the GPRS/EDGE radio access network GERAN:

TABLE 1

|  | RLC protocol | MAC protocol |
|---|---|---|
| Counter parameter 402: length 32 bits | RLC sequence number: length 7 or 11 bits, value range 0-127 or 0-2047. Symbol for defining whether data to be encrypted is data of second layer signaling plane or other data: length 1 bit, value 1. Hyper frame number length 24 or 20 bits. | Extended TDMA frame number: length 28 bits, value range 0-($2^{28}$-1) Time slot number: length 3 bits, value 0-7. Symbol for defining whether data to be encrypted is data of second layer signaling plane or other data: length 1 bit, value 1. |
| Directional parameter 404: length 1 bit, value 0/1 |  |  |
| Bearer parameter 406: length 5 bits |  |  |
| Length parameter 410: length 16 bits | Value: length of payload, or length of full block without radio bearer identifier and RLC sequence number. | Value: length of full block. |
| Encryption key parameter 408: length 128 bits. |  |  |

Table 1 shows how the input parameters of required format are obtained from the GERAN operating parameters when transmitting user plane data. The leftmost column of the table shows the parameters required by UTRAN. The middle column shows an alternative, in which encryption is performed in the RLC protocol layer, and the rightmost column shows an alternative, in which the encryption is performed in the MAC protocol layer.

The UTRAN directional parameter 404 defines the transmission direction, to which the data to be encrypted is transmitted. Value 0 is uplink and value 1 is downlink. The directional parameter 404 can also be used as such in GERAN.

In UTRAN, the bearer parameter 406 defines the used radio bearer identifier. This makes it possible to use the same encryption key 408 when a user uses simultaneously several different radio bearers which have been multiplexed to the same physical layer frame. The bearer parameter 406 can be used as such in GERAN.

In UTRAN, the length parameter 410 defines the required key stream length, i.e. the length of the encryption mask 412. The length parameter 410 can be used as such in GERAN. When using the RLC protocol, its value is the length of the payload or the length of a full block without the radio bearer identifier and RCL sequence number. When using the MAC protocol, its value is the length of a full block, in which case the radio bearer identifier is not included in the information flow, but is agreed on before starting transmission.

In UTRAN, the encryption key parameter 408 defines the encryption key. The encryption key parameter 408 can be used as such in GERAN.

The UTRAN counter parameter 402 is a 32-bit counter changing with time and formed by the hyper frame number and RLC sequence number, for instance. In the original GSM system, a 22-bit TDMA frame number is used as the counter parameter. This means that the counter parameter reaches its maximum value already after approximately 3.5 hours of encryption. When the counter parameter starts again, the mask begins to get the same values again and the encryption can be broken unless a new encryption key is taken into use.

The counter parameter 402 cannot as such be used in GERAN, but its contents must be changed while the length remains at 32 bits. When using the RLC protocol, the counter parameter 402 is formed by the RLC sequence number, a symbol which defines whether the data to be encrypted is data of the second layer signaling plane or other data, and the hyper frame number. The length of the hyper frame number can be 24 bits, in which case the length of the RLC sequence number is 7 bits, or the hyper frame number can be 20 bits long, in which case the RLC sequence number is 11 bits long. The 1-bit symbol which defines whether the data to be encrypted is data of the second layer signaling plane or other data obtains in this case the value 1, when the data to be encrypted is other data than data of the second layer signaling plane. In practice, when using the RLC protocol, the effective length of the counter parameter becomes 31 bits, while the 1-bit symbol is constant.

When using the MAC protocol, the counter parameter 402 is formed by an extended TDMA frame number, a time-slot number and a symbol defining whether the data to be encrypted is data of the second layer signaling plane or other data. The length of the TDMA frame number is thus extended to 28 bits. The 1-bit symbol which defines whether the data to be encrypted is data of the second layer signaling plane or other data obtains in this case the value 1, when the data to be encrypted is other data than data of the second layer signaling plane. The time slot number can be constant, if only one time slot is used. In practice, when using the MAC protocol, the effective length of the counter parameter becomes 28 bits, while the 1-bit symbol and the time slot number are constant. This is 64 times more than the cycle of the present GSM counter parameter, and thus sufficient in practice.

The same idea as with the hyper frame number is used with the extended TDMA frame number. In the present GSM system, the 11 most significant bits of the TDMA frame number are used to calculate a multi-frame. These 11 bits form a T1 counter part which when extended to 16 bits provides the extended TDMA frame number. A 5-bit T2 counter part and a 6-bit T3 counter part can be kept in the extended TDMA frame number.

When using the RLC protocol, the payload of the user, but not the radio bearer identifier or the RLC block header, are encrypted to ensure the reception of the RLC sequence number. Another alternative is to encrypt the payload of the user and the header of the block, but not the RLC sequence number or the radio bearer identifier. When using the MAC protocol, the entire MAC block is encrypted.

Table 2 shows how the input parameters of required format are obtained from the GERAN operating parameters when transmitting second layer signaling plane data. The encryption must then be performed in the MAC protocol layer.

The directional parameter 404, length parameter 410 and encryption key parameter 408 can be used in the same way when transmitting second layer signaling plane data as when transmitting other data.

There is no radio bearer identifier for the second layer signaling plane data, so the bearer parameter 406 is given a constant value, for instance "00000". A specific meaning can also be defined for this constant value, as described later.

TABLE 2

| | MAC protocol |
|---|---|
| Counter parameter 402: length 32 bits | Extended TDMA frame number: length 28 bits, value range 0-($2^{28}$-1) Time slot number: length 3 bits, value 0-7. Symbol for defining whether data to be encrypted is data of second layer signaling plane or other data: length 1 bit, value 0. |
| Directional parameter 404: length 1 bit, value 0/1 | |
| Bearer parameter 406: length 5 bits | Value "00000" |
| Length parameter 410: length 16 bits | Value: length of full block. |
| Encryption key parameter 408: length 128 bits | |

The counter parameter 402 is formed for the second layer signaling plane data in the same way as for other data when using the MAC protocol, i.e. the counter parameter 402 is formed by an extended TDMA frame number, a time slot number and a symbol which defines whether the data to be encrypted is data of the second layer signaling plane or other data. The 1-bit symbol which defines whether the data to be encrypted is data of the second layer signaling plane or other data obtains in this case the value 0, when the data to be encrypted is data of the second layer signaling plane. The entire MAC block is encrypted.

Naturally, the possible values of the 1-bit symbol could be defined the other way round, i.e. value 1 would mean that the data to be encrypted is data of the second layer signaling plane, and value 0 would mean that the data to be encrypted is other data.

The following describes alternative preferred embodiments of the invention.

In a preferred embodiment, one of the bearer parameter values is reserved for signaling plane data to be encrypted. This is the above-mentioned constant value, for instance "00000", described in table 2. This way, it is possible to replace the symbol which defines whether the data to be encrypted is data of the second layer signaling plane or other data. The value "00000" defines that the data to be encrypted is data of the second layer signaling plane, and any other value defines the used radio bearer identifier. As mentioned above, no radio bearer identifier is used for the second layer signaling plane data. This method provides the advantage that the effective length of the counter parameter increases by one bit, and the disadvantage that a specific meaning must be defined for one radio bearer identifier.

In a preferred embodiment, when using the MAC protocol, the information to be stored on the last used extended TDMA frame number is stored in the user equipment UE for the next connection, in practice it is generally stored on the SIM (Subscriber Identity Module) card of the user equipment UE. Hyper frame number management known from UTRAN is applied hereto. If several radio bearers are used on the same connection, then the extended TDMA frame number is stored which has obtained the biggest value. When establishing a new connection, only one value then needs to be communicated, and this value is used to begin the encryption of the new connection. In UTRAN, said value is referred to as START. The information on the last used extended TDMA frame number preferably comprises a certain number of the most significant bits in the extended TDMA frame number. Correspondingly, when using the RLC protocol, the information on the last used hyper frame number is stored in the user equipment UE for the next connection. The information to be stored on the last used hyper frame number preferably comprises a certain number of the most significant bits of the hyper frame number. The described storing of the extended TDMA frame number and/or hyper frame number for the next connection can also be performed in the GPRS/EDGE radio access network GERAN, most preferably in the packet control unit 180. How the signaling of said stored value can easiest and most efficiently be done between the user equipment and the GPRS/EDGE radio access network GERAN when establishing a new connection affects the selection of the storage location. One stored START value takes care of connections using both the RLC protocol and the MAC protocol to the same user, i.e. the maximum of the used values is stored.

In a preferred embodiment, when the connection of the user equipment UE changes between the GPRS/EDGE radio access network GERAN and the radio access network UTRAN employing wideband code division multiple access method, information on the last used extended TDMA frame number or hyper frame number is provided to the new radio access network, and the same encryption key input parameter 408 as in the old radio access network is used as the encryption key input parameter 408 of the encryption algorithm 400 in the new radio access network. This way, it is possible to avoid the use of the same mask 412 for unencrypted data 414 with different content. Without this procedure, it would be necessary to always perform the signaling required by the initiation of a new encryption key between the user equipment UE and the GPRS/EDGE radio access network GERAN when the connection changes, due to handover, for instance. In principle, this procedure can be implemented in two ways, either so that the user equipment comprises means 190, 192, 194 for providing information on the last used extended TDMA frame number or hyper frame number to the new radio access network when the connection of the user equipment UE changes between the GPRS/EDGE radio access network GERAN and the radio access network UTRAN employing wideband code division multiple access method, or so that the GPRS/EDGE radio access network GERAN comprises means 180 for receiving information on the last used extended TDMA frame number or hyper frame number to the user equipment UE when the connection of the user equipment UE changes between the GPRS/EDGE radio access network GERAN and the radio access network UTRAN employing wideband code division multiple access method.

The described procedures are preferably implemented in such a manner that the information to be stored or provided comprises a certain number of the most significant bits, and before the information is used in the new radio connection or radio access network, the value of the number formed by the most significant bits is increased by one. This way, it is possible to avoid the use of the same encryption mask 412 twice for unencrypted data 414 with different content. This can be implemented so that either the user equipment UE or the GPRS/EDGE radio access network GERAN comprises means 402 for increasing by one the value of the number formed by said most significant bits before the information is used in a new connection or in the new radio access network. For instance, when moving from GERAN to UTRAN, 20 most significant bits could be stored and when moving from UTRAN to GERAN, 17 most significant bits could be stored. This way, the differences between the less significant parts remain unimportant, and it is possible to ensure that the same encryption mask 412 is not used twice.

Figure 3:
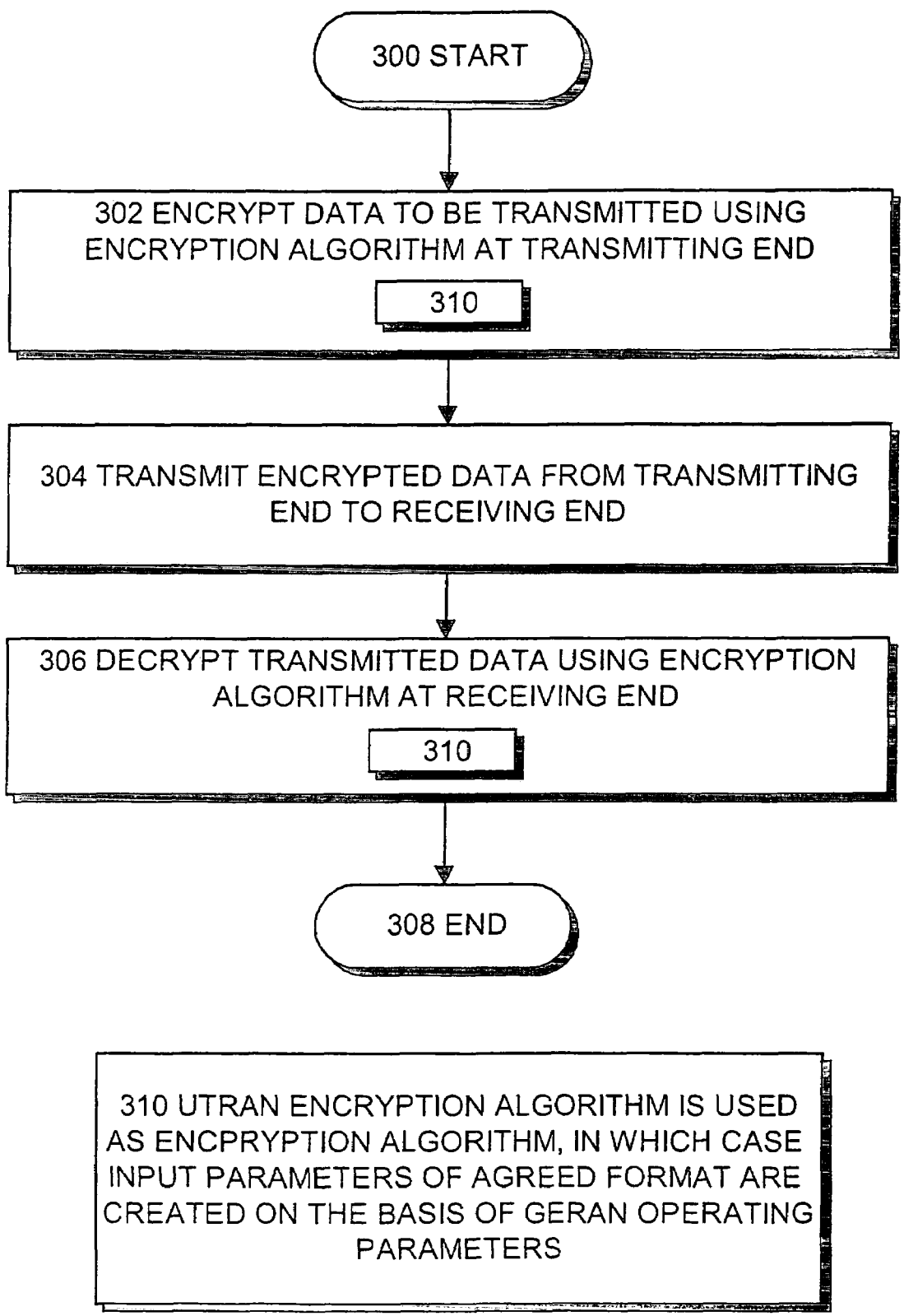
FIG. 3 is a flow chart illustrating a method for data transmission.

With reference to the flow chart in FIG. 3, the following presents the steps that are taken in the method for transmitting data between the GPRS/EDGE radio access network GERAN and user equipment UE of a mobile system. The method starts from block 300.

In block 302, the data to be transmitted is encrypted using an encryption algorithm 400 at the transmitting end.

In block 304, the encrypted data is transmitted from the transmitting end to the receiving end.

In block 306, the transmitted data is decrypted using the encryption algorithm 400 at the receiving end.

The placing of block 310 at both the transmitting end and the receiving end describes the fact that an encryption algorithm 400 of the radio access network UTRAN employing the wideband code division multiple access method of the universal mobile telecommunications system is used as the encryption algorithm 400, in which case the input parameters 402, 404, 406, 408, 410 of agreed format required by the encryption algorithm 400 are created on the basis of the operating parameters of the GPRS/EDGE radio access network GERAN.

As the accompanying claims reveal, the method can be modified using the above preferred embodiments of the user equipment UE and the GPRS/EDGE radio access network GERAN.

Even though the invention has been explained in the above with reference to examples in accordance with the accompanying drawings, it is obvious that the invention is not restricted to them but can be modified in many ways within the scope of the inventive idea disclosed in the attached claims.

The invention claimed is:

1. A method in a mobile system, comprising:
encrypting data to be transmitted between a radio access network of a packet-switched time division multiple access mobile system and user equipment using an encryption algorithm at a transmitting end,
wherein an encryption algorithm of a radio access network of a wideband code division multiple access mobile system is used as the encryption algorithm, in which case input parameters of a format required by the encryption algorithm are created on the basis of operating parameters of the radio access network of the packet-switched time division multiple access mobile system and at least a counter parameter of the operating parameters is adapted depending on a protocol currently used.

2. A method as claimed in claim 1, wherein the encryption algorithm is a black box and implementation of the encryption algorithm is exactly the same in both the radio access network of the packet-switched time division multiple access mobile system and the radio access network of the wideband code division multiple access mobile system.

3. A method as claimed in claim 1, wherein the counter parameter comprises a symbol which defines whether the data to be encrypted is data of a second layer signaling plane or other data.

4. A method as claimed in claim 1, wherein when executing the encryption algorithm in a MAC layer of a protocol stack, the counter parameter comprises an extended TDMA frame number.

5. A method as claimed in claim 4, wherein the extended TDMA frame number is based on extending a T1 counter part of GSM.

6. A method as claimed in claim 4, wherein information on a last used extended TDMA frame number is stored in the user equipment for a next connection.

7. A method as claimed in claim 6, wherein the information to be stored on the last used extended TDMA frame number comprises a certain number of the most significant bits of the extended TDMA frame number, and before the information is used in a new radio connection to form an extended TDMA frame number, the value of the number formed by said most significant bits is increased by one.

8. A method as claimed in claim 1, wherein when executing the encryption algorithm in a MAC layer of a protocol stack, the counter parameter comprises a time slot number.

9. A method as claimed in claim 1, wherein when executing the encryption algorithm in an RLC layer of a protocol stack, the counter parameter comprises a hyper frame number.

10. A method as claimed in claim 9, wherein information is stored on a last used hyper frame number in the user equipment for a next connection, and before the information is used in a new radio connection to form a hyper frame number, the value of the number is increased by one.

11. A method as claimed in claim 10, wherein the information to be stored on the last used hyper frame number comprises a certain number of most significant bits of the hyper frame number.

12. A method in a mobile system, comprising:
decrypting received data, transmitted between a radio access network of a packet-switched time division multiple access system and user equipment, using an encryption algorithm at the receiving end;
using an encryption algorithm of a radio access network of a wideband code division multiple access system as the encryption algorithm; and
creating input parameters of a format required by the encryption algorithm on the basis of operating parameters of the radio access network of the packet-switched time division multiple access system, wherein at least a counter parameter of the operating parameters is adapted depending on a protocol currently used.

13. A method as claimed in claim 1 or 12, wherein the required format of the input parameters of the encryption algorithm defines the number of the input parameters and the length of each parameter.

14. A method as claimed in claim 1 or 12, wherein the input parameters comprise a bearer parameter, and one of the bearer parameter values is reserved for signaling plane data to be encrypted.

15. A method as claimed in claim 1 or 12, wherein when a connection of the user equipment changes between the radio access network of the packet-switched time division multiple access mobile system and the radio access network of the wideband code division multiple access mobile system, information on a last used extended TDMA frame number or hyper frame number is provided to a new radio access network, and the same encryption key input parameter as in an old radio access network is used as the encryption key input parameter of the encryption algorithm in the new radio access network.

16. A method as claimed in claim 15, wherein the information to be provided comprises a certain number of most significant bits, and before the information is used in a new radio access network, the value of the number formed by said most significant bits is increased by one.

17. An apparatus for a mobile system, comprising:
means for encrypting data, to be transmitted in a packet-switched time division multiple access mobile system, using an encryption algorithm,
wherein the encryption algorithm is an encryption algorithm of a radio access network of a wideband code division multiple access mobile system, and the apparatus comprises means for creating input parameters of an agreed format required by the encryption algorithm on the basis of operating parameters of a radio access network of the packet-switched time division multiple access mobile system and at least a counter parameter of the operating parameters is adapted depending on a protocol currently used.

18. An apparatus as claimed in claim 17, wherein the encryption algorithm is a black box and implementation of the encryption algorithm is exactly the same in both the radio access network of the packet-switched time division multiple access mobile system and the radio access network of the wideband code division multiple access mobile system.

19. The apparatus as claimed in claim 17, wherein the counter parameter comprises a symbol which defines whether the data to be encrypted is data of a second layer signaling plane or other data.

20. The apparatus as claimed in claim 17, wherein when executing the encryption algorithm in a MAC layer of a protocol stack, the counter parameter comprises an extended TDMA frame number.

21. The apparatus as claimed in claim 20, wherein the extended TDMA frame number is based on extending a T1 counter part of GSM.

22. The apparatus as claimed in claim 20, wherein the apparatus comprises means for storing information on a last used extended TDMA frame number for a next connection.

23. The apparatus as claimed in claim 22, wherein the information to be stored on the last used extended TDMA frame number comprises a certain number of the most significant bits of the extended TDMA frame number, and the apparatus comprises means for increasing by one the value of the number formed by said most significant bits before the information is used in a new radio connection to form an extended TDMA frame number.

24. The apparatus as claimed in claim 17, wherein when executing the encryption algorithm in a MAC layer of a protocol stack, the counter parameter comprises a time slot number.

25. The apparatus as claimed in claim 17, wherein when executing the encryption algorithm in an RLC layer of a protocol stack, the counter parameter comprises a hyper frame number.

26. The apparatus as claimed in claim 25, wherein the apparatus comprises means for storing information on a last used hyper frame number for a next connection.

27. The apparatus as claimed in claim 26, wherein the information to be stored on the last used hyper frame number comprises a certain number of the most significant bits of the hyper frame number, and the apparatus comprises means for increasing by one the value of the number formed by said most significant bits before the information is used in a new radio connection to form a hyper frame number.

28. An apparatus in a mobile system, comprising:
means for decrypting received data using an encryption algorithm at a receiving end, the data transmitted in a packet-switched time division multiple access mobile system, wherein the encryption algorithm is an encryption algorithm of a radio access network of a wideband code division multiple access system; and
means for creating input parameters of an agreed format required by the encryption algorithm on the basis of operating parameters of a radio access network of the packet-switched time division multiple access system, wherein at least a counter parameter of the operating parameters is adapted depending on a protocol currently used.

29. The apparatus of claim 28 wherein the apparatus is user equipment (UE).

30. The apparatus of claim 28, wherein the apparatus is a radio access network.

31. An apparatus as claimed in claim 17 or 28, wherein the agreed format of the input parameters of the encryption algorithm defines the number of the input parameters and the length of each parameter.

32. The apparatus as claimed in claim 31, wherein the apparatus comprises means for receiving information on a last used extended TDMA frame number or hyper frame number when a connection changes between the radio access network of the packet-switched time division multiple access mobile system and the radio access network wideband code division multiple access mobile system, and for using as the encryption key parameter of the encryption algorithm, the encryption key parameter according to the received information.

33. The apparatus as claimed in claim 32, wherein the information to be provided comprises a certain number of most significant bits, and the apparatus comprises means for increasing by one the value of the number formed by said most significant bits before the information is used.

34. The apparatus of claim 31 wherein the apparatus is user equipment (UE).

35. The apparatus of claim 31, wherein the apparatus is a radio access network.

36. The apparatus as claimed in claim 17 or 28, wherein the input parameters comprise a bearer parameter, and one of the bearer parameter values is reserved for signaling plane data to be encrypted.

37. The apparatus as claimed in claim 17 or 28, wherein the apparatus comprises means for providing information on a last used extended TDMA frame number or hyper frame number to a new radio access network when a connection of the apparatus changes between the radio access network of a packet-switched time division multiple access mobile system and the radio access network of the wideband code division multiple access mobile system, and for using the same encryption key parameter as in an old radio access network as the encryption key parameter of the encryption algorithm in the new radio access network.

38. The apparatus claimed in claim 37, wherein the information to be provided comprises a certain number of most significant bits, and the apparatus comprises means for increasing by one the value of the number formed by said most significant bits before the information is used in a new radio access network.

* * * * *